United States Patent
Wang et al.

(10) Patent No.: US 11,262,562 B2
(45) Date of Patent: Mar. 1, 2022

(54) INFRARED CAMERA MODULE COVER

(71) Applicant: WAYMO LLC, Mountain View, CA (US)

(72) Inventors: Zhaokun Wang, Mountain View, CA (US); Albert Shane, Mountain View, CA (US); YooJung Ahn, Mountain View, CA (US); Jeffrey Du, San Jose, CA (US); Scott Duncan, Sunnyvale, CA (US); Choon Ping Chng, Los Altos, CA (US); Cheng-Han Wu, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 0 days.

(21) Appl. No.: 16/822,272

(22) Filed: Mar. 18, 2020

(65) Prior Publication Data

US 2021/0294081 A1    Sep. 23, 2021

(51) Int. Cl.
    *G02B 13/14*    (2006.01)
    *B60R 1/00*    (2006.01)
    *G03B 17/02*    (2021.01)

(52) U.S. Cl.
    CPC ............. *G02B 13/14* (2013.01); *B60R 1/00* (2013.01); *G03B 17/02* (2013.01)

(58) Field of Classification Search
    CPC ............ G02B 13/14; B60R 1/00; G03B 17/02
    See application file for complete search history.

(56) References Cited

U.S. PATENT DOCUMENTS

| | | | |
|---|---|---|---|
| 7,217,020 B2* | 5/2007 | Finch | B60Q 1/0041 362/544 |
| 8,456,769 B2 | 6/2013 | Teraoka et al. | |
| 10,290,158 B2 | 5/2019 | Jales Costa et al. | |
| 10,530,974 B2 | 1/2020 | Kraz et al. | |
| 2009/0284603 A1* | 11/2009 | Hsieh | C08J 3/226 348/164 |

(Continued)

OTHER PUBLICATIONS

Arducam Day-Night Vision for Raspberry Pi Camera—retrieved from the Internet Feb. 3, 2020 (9 pages).

(Continued)

*Primary Examiner* — Clifford Hilaire
*Assistant Examiner* — Tyler B Edwards
(74) *Attorney, Agent, or Firm* — Botos Churchill IP Law

(57) ABSTRACT

The technology provides a camera module cover that prevents infrared light from leaking into the lens of an adjacent camera. The camera module cover can be used with in-vehicle environments, such as the passenger area and truck, as well as other indoor locations and places where infrared illumination is co-located with an optical camera system. An infrared illuminator unit is positioned adjacent to the camera, for instance in such a way that infrared light is evenly distributed or diffused around the camera lens. The camera module cover has a surface that includes an infrared-transparent material to promote even distribution of the infrared light. To avoid leakage into the camera lens, an infrared-opaque or otherwise blocking material is disposed within the cover so as to be between the infrared illuminator unit and the camera lens. The infrared-transparent and infrared-blocking materials may be formed as a single part via double injection molding.

22 Claims, 18 Drawing Sheets

(56) References Cited

U.S. PATENT DOCUMENTS

| | | |
|---|---|---|
| 2017/0291548 A1 | 10/2017 | Kim et al. |
| 2018/0091775 A1 | 3/2018 | Jung et al. |
| 2018/0126960 A1 | 5/2018 | Reibling et al. |
| 2018/0191930 A1* | 7/2018 | Jeong .................. H05K 1/144 |
| 2019/0052778 A1 | 2/2019 | Kraz et al. |
| 2019/0197325 A1 | 6/2019 | Reiley et al. |
| 2019/0258263 A1 | 8/2019 | Wendel et al. |
| 2020/0029002 A1* | 1/2020 | Polak .................. H04N 5/2251 |
| 2020/0195816 A1* | 6/2020 | Stein .................. H04N 5/2256 |
| 2020/0204713 A1* | 6/2020 | Potter ................. H04N 5/2254 |

OTHER PUBLICATIONS

ELP 2MP Sony IMX322 IR Night Vision Security Surveillance CCTV Video Webcam Cam—retrieved from the Internet Feb. 3, 2020 (23 pages).

FLIR Lepton 2.5, LWIR Micro Thermal Camera Module, 2019, (2 pages).

KINAMAX WCM-6LNV WebCam—retrieved from the Internet Feb. 3, 2020 (3 pages).

Webcam Streaming 1080P Full HD with Dual Microphone and Ring Light, Aoboco USB Pro Web Camera—retrieved from the Internet Feb. 3, 2020 (9 pages).

\* cited by examiner

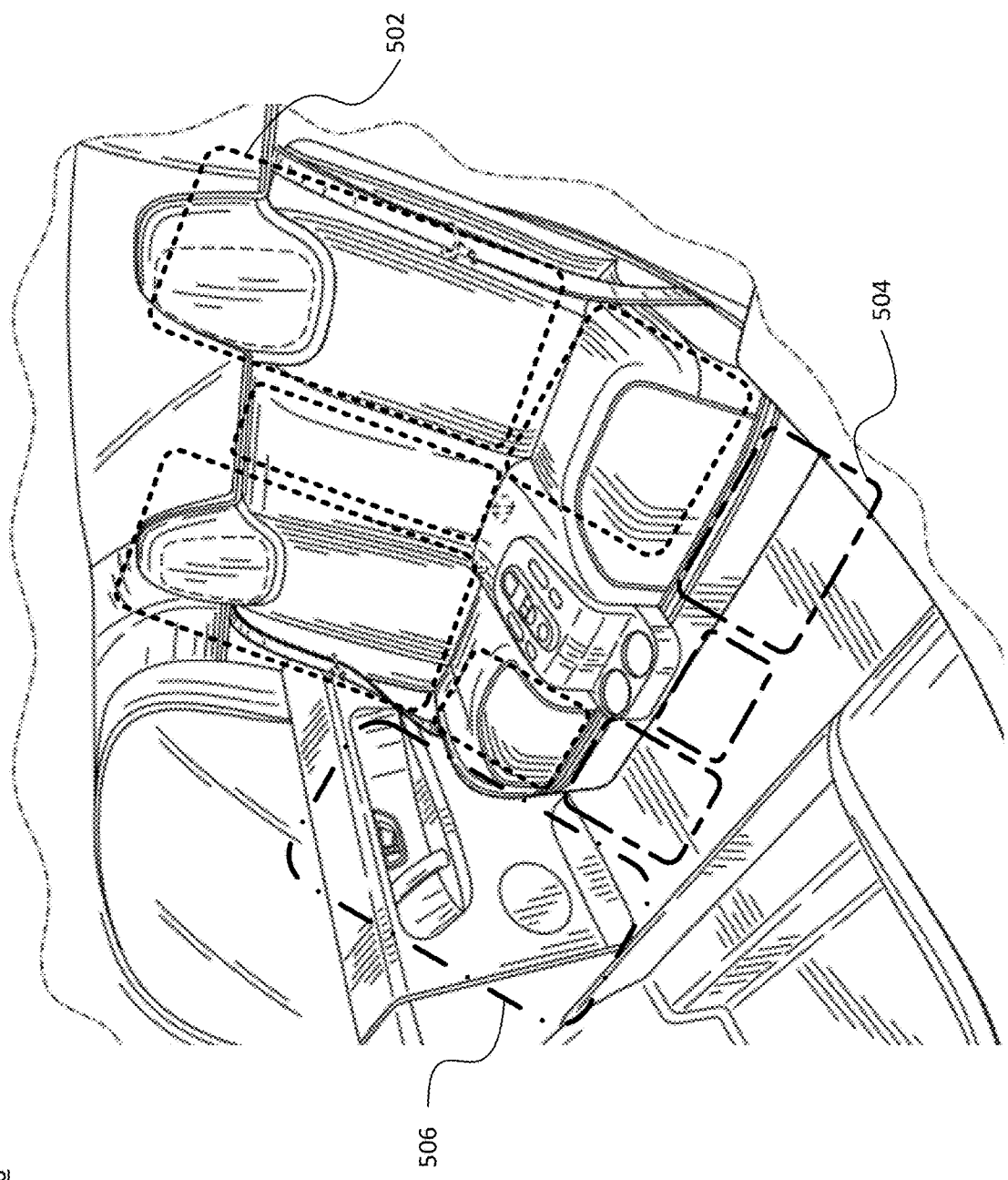

530

540

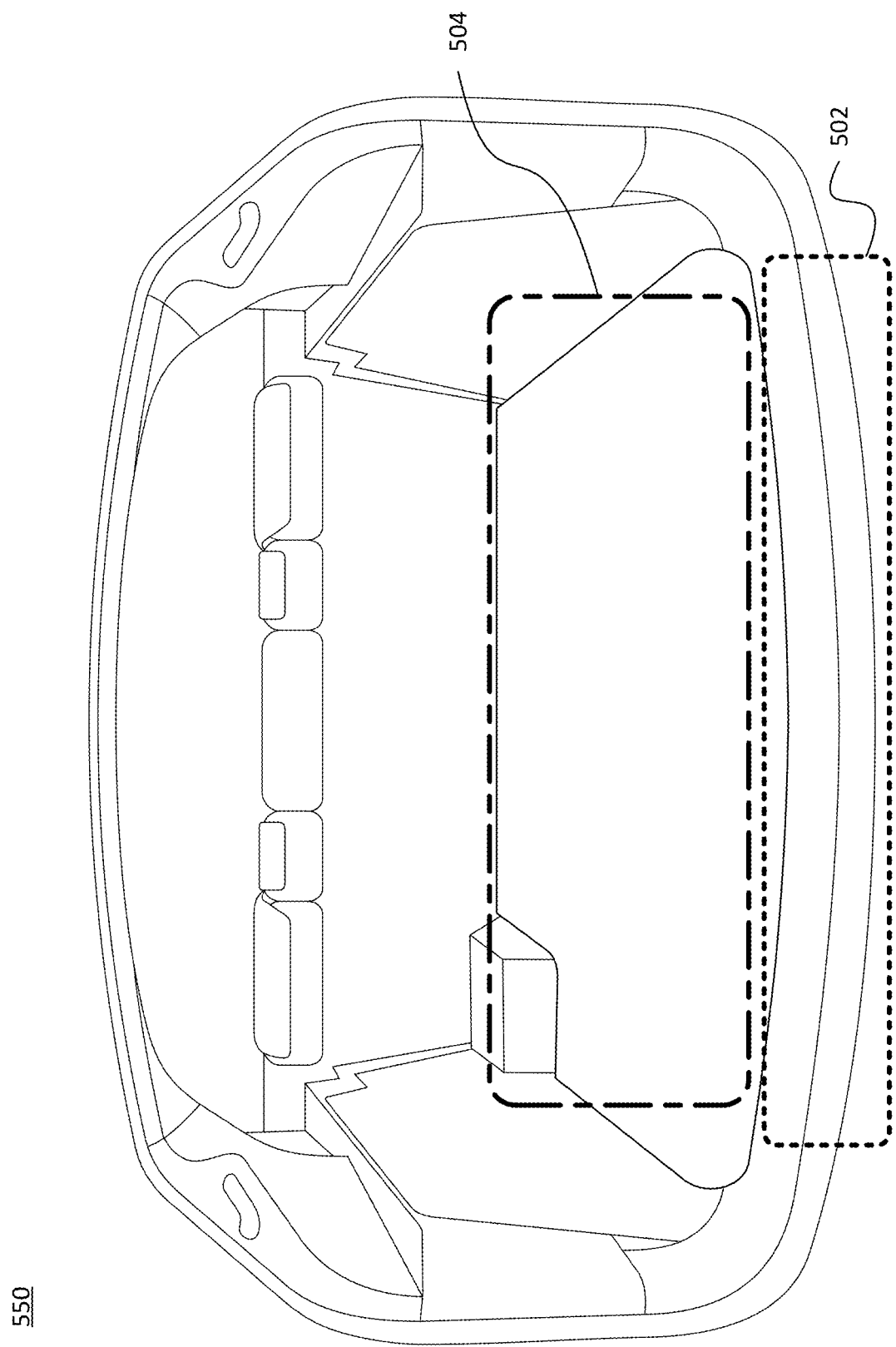

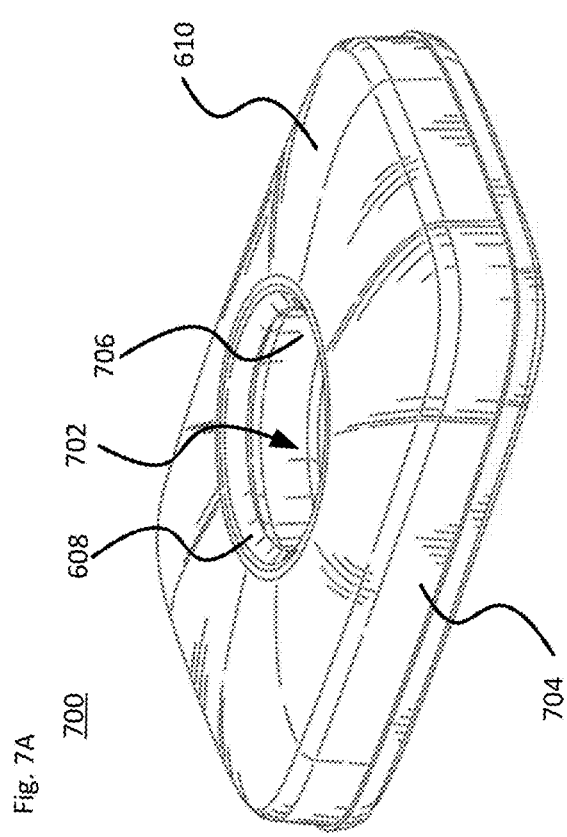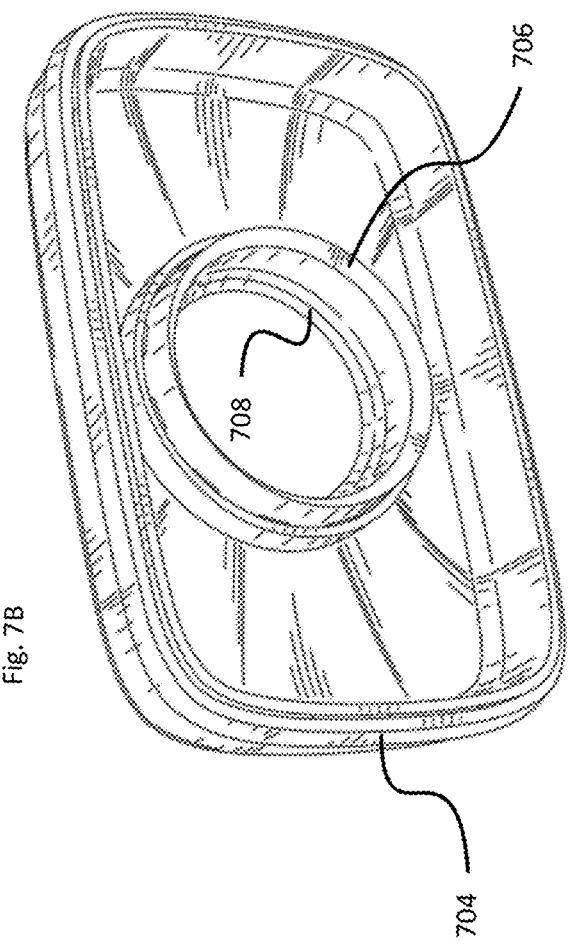

INFRARED CAMERA MODULE COVER

CROSS-REFERENCE TO RELATED APPLICATIONS

This application is related to co-pending U.S. design application No. 29/728,372, filed Mar. 18, 2020 the entire disclosure of which is incorporated by reference herein.

BACKGROUND

Vehicles, such as manually operated and autonomous vehicles, may employ in-vehicle cameras as part of a driver assistance system. Such cameras may be able to provide high quality images in certain lighting conditions. Optical or infrared illumination may be used to enhance image quality in low-light conditions. However, if the illumination device is not properly positioned with respect to the camera, this can adversely affect the camera's image quality.

BRIEF SUMMARY

The technology relates to a camera module cover that prevents infrared (IR) light from leaking into the lens of an adjacent camera. The camera module cover can be used in vehicles that operate in manual and autonomous driving modes, indoor locations and other places where infrared illumination is provided with a camera system.

According to one aspect, a camera module cover for an infrared-illuminated camera module is provided. The camera module cover includes an infrared-transparent surface having an opening therein, in which the opening is configured to receive a lens of a camera module. The infrared-transparent surface is configured to pass infrared light from an infrared emitter of a base unit therethrough to illuminate an external environment. The camera module cover also includes an exterior sidewall extending around the infrared-transparent surface, and an infrared-blocking member disposed within the opening and directly coupled to the infrared-transparent surface. The infrared blocking member includes an interior sidewall configured to block the infrared light from the infrared emitter from entering the lens of the camera module.

In one example, the infrared-blocking member further includes a beveled edge adjoining the infrared-transparent surface. The beveled edge angles away from the infrared transparent surface, so that the lens of the camera module, when the camera module is covered by the camera module cover, is disposed below a plane of the infrared-transparent surface. The infrared-blocking member may further include a lip that adjoins the beveled edge and is adjacent to the interior sidewall. The interior sidewall, beveled edge and lip may all be formed from a single piece of infrared-blocking material.

In any of the examples, the exterior sidewall may be formed of a same material as the infrared-transparent surface.

The exterior sidewall and the infrared-transparent surface may be formed as one unit. The one unit may be formed by injection molding. In one example, the infrared-blocking member is formed as a second unit by injection molding. Here, the first unit and the second unit can be formed by a double injection molding process.

The interior sidewall and the exterior sidewall may be spaced apart from one another, forming an open area therebetween so that the infrared light is able to pass through the open area unimpeded. The infrared-transparent surface may have a rectangular shape or other geometric shape (e.g., oval, circular, etc.). The opening may be centrally disposed along the infrared-transparent surface.

According to another aspect, a camera module assembly comprises the camera module cover in any of the configuration as described above, along with the infrared emitter of the base unit. In one example, the camera module assembly further comprises the camera module.

According to yet another aspect, a method of fabricating a camera module cover is provided. The method comprises forming an infrared-transparent surface having an opening therein, the opening configured to receive a lens of a camera module, and the infrared-transparent surface being configured to pass infrared light from an infrared emitter of a base unit therethrough to illuminate an external environment; forming an exterior sidewall extending around the infrared-transparent surface; and forming an infrared-blocking member so that the infrared-blocking member is disposed within the opening and coupled to the infrared-transparent surface, the infrared blocking member including an interior sidewall configured to block the infrared light from the infrared emitter from entering the lens of the camera module.

The exterior sidewall may be formed concurrently with the infrared-transparent surface using injection molding. The infrared-blocking member may be formed using injection molding. The method may further comprise securing the infrared-blocking member along the opening of the infrared-transparent surface. Here, securing the infrared-blocking member along the opening of the infrared-transparent surface can be performed during a double injection molding process.

In addition to the above, forming the infrared-blocking member may include forming a beveled edge adjoining the opening of the infrared-transparent surface, the beveled edge angling away from the infrared transparent surface so that the lens of the camera module, when the camera module is covered by the camera module cover, is disposed below a plane of the infrared-transparent surface; and forming a lip that adjoins the beveled edge and is adjacent to the interior sidewall.

BRIEF DESCRIPTION OF THE DRAWINGS

FIGS. 5A-F illustrate vehicle regions and priorities in accordance with aspects of the technology.

FIGS. 7A-F illustrates an example of a camera module cover in accordance with aspects of the technology.

DETAILED DESCRIPTION

The camera module cover according to the present technology is able to block infrared light from entering the lens of the camera. An IR illuminator unit may be positioned adjacent to the camera, for instance in such a way that IR light is evenly distributed or diffused around the camera. The cover includes an IR-transparent material promotes even distribution of the IR light. However, because leakage into the camera lens can adversely affect the quality of the imagery, an IR-opaque material is disposed within the cover between the illuminator unit and the lens. These and other features are discussed below.

Example Vehicle Systems

Figure 1A:
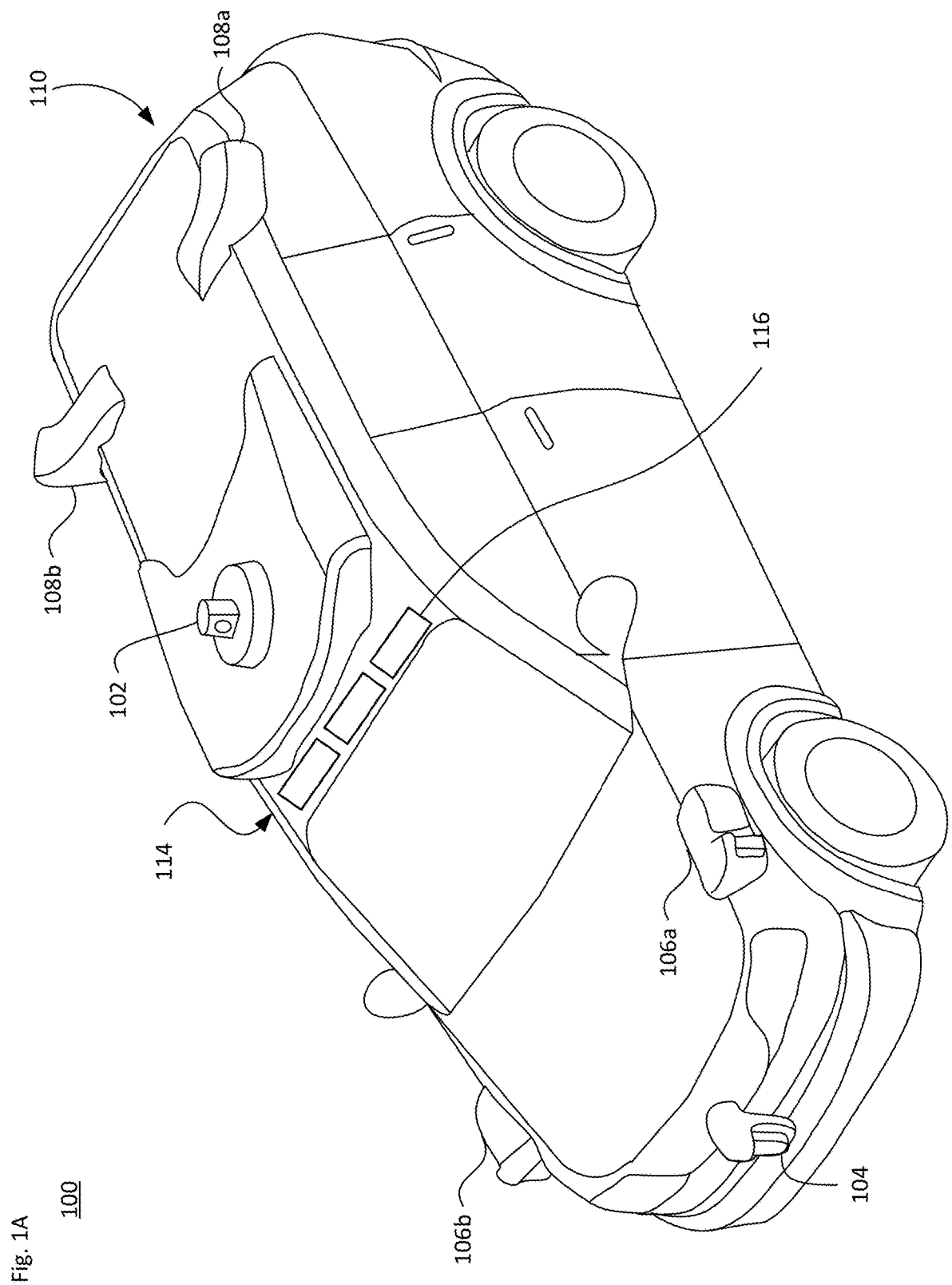
FIGS. 1A-B illustrate an example passenger-type vehicle configured for use with aspects of the technology.
Figure 1B:
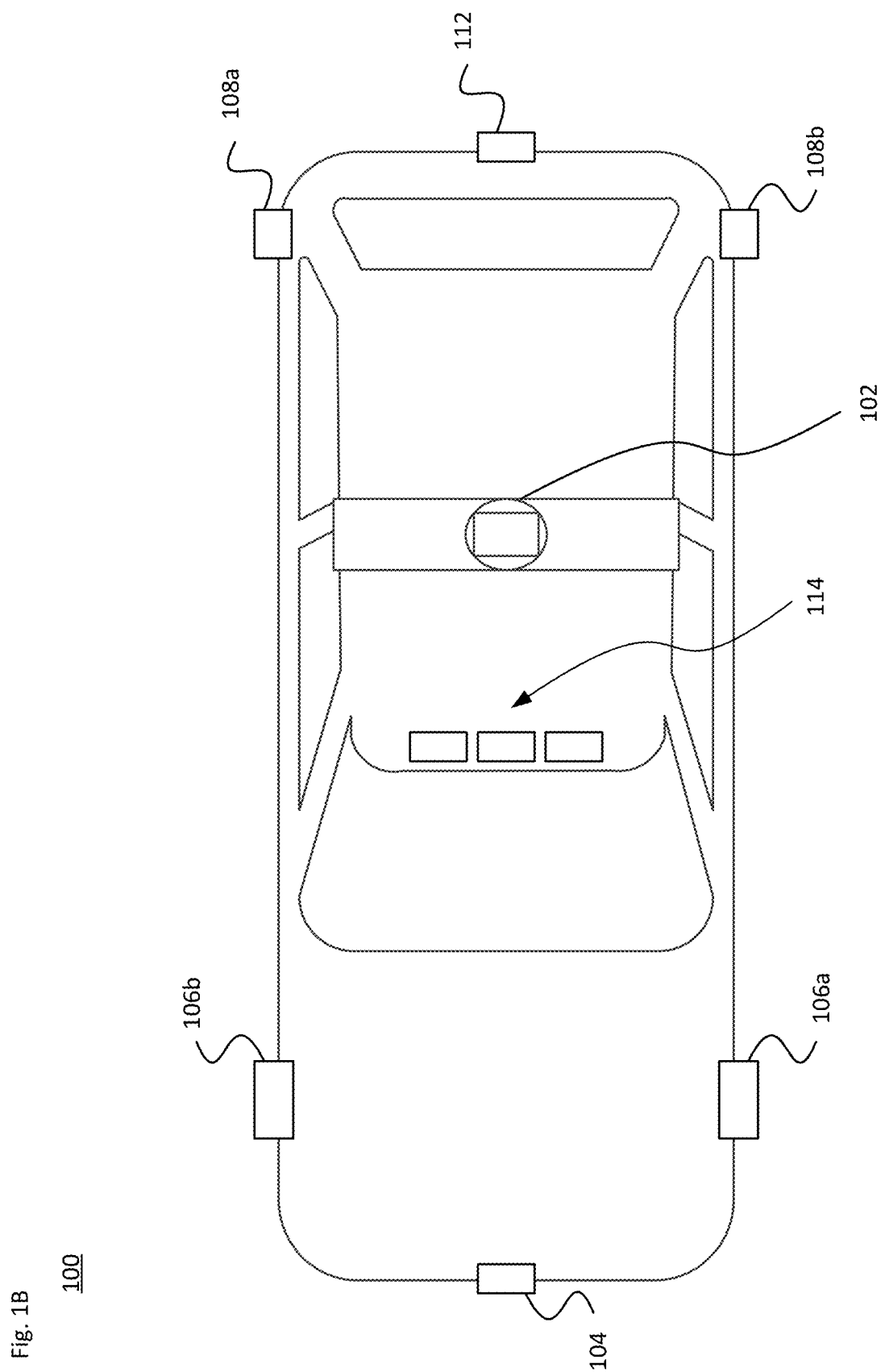

As noted above, the camera module cover can be used with in-vehicle imaging systems, as well as in other environments. FIG. 1A illustrates a perspective view of an example passenger vehicle 100, such as a minivan, sport utility vehicle (SUV) or other vehicle. FIG. 1B illustrates a top-down view of the passenger vehicle 100. As shown, the passenger vehicle 100 includes various external sensors for obtaining information about the vehicle's outside environment, which enable the vehicle to operate in an autonomous driving mode. For instance, a roof-top housing 102 may include a lidar sensor as well as various cameras, radar units, infrared and/or acoustical sensors. Housing 104, located at the front end of vehicle 100, and housings 106a, 106b on the driver's and passenger's sides of the vehicle, may each incorporate lidar, radar, camera and/or other sensors. For example, housing 106a may be located in front of the driver's side door along a quarter panel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (112 in FIG. 1B) may be positioned along the rear of the vehicle 100, such as on or adjacent to the bumper. And arrow 114 indicates a series of sensor units 116 arranged along a forward-facing direction of the vehicle. In some examples, the passenger vehicle 100 also may include various sensors for obtaining information about the vehicle's interior spaces (not shown).

By way of example, each external sensor unit may include one or more sensors, such as lidar, radar, camera (e.g., optical or IR), acoustical (e.g., microphone or sonar-type sensor), inertial (e.g., accelerometer, gyroscope, etc.) or other sensors (e.g., positioning sensors such as GPS sensors). While certain aspects of the disclosure may be particularly useful in connection with specific types of vehicles, the vehicle may be any type of vehicle including, but not limited to, cars, trucks, motorcycles, buses, recreational vehicles, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive fully autonomously without human assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy.

Figure 2:
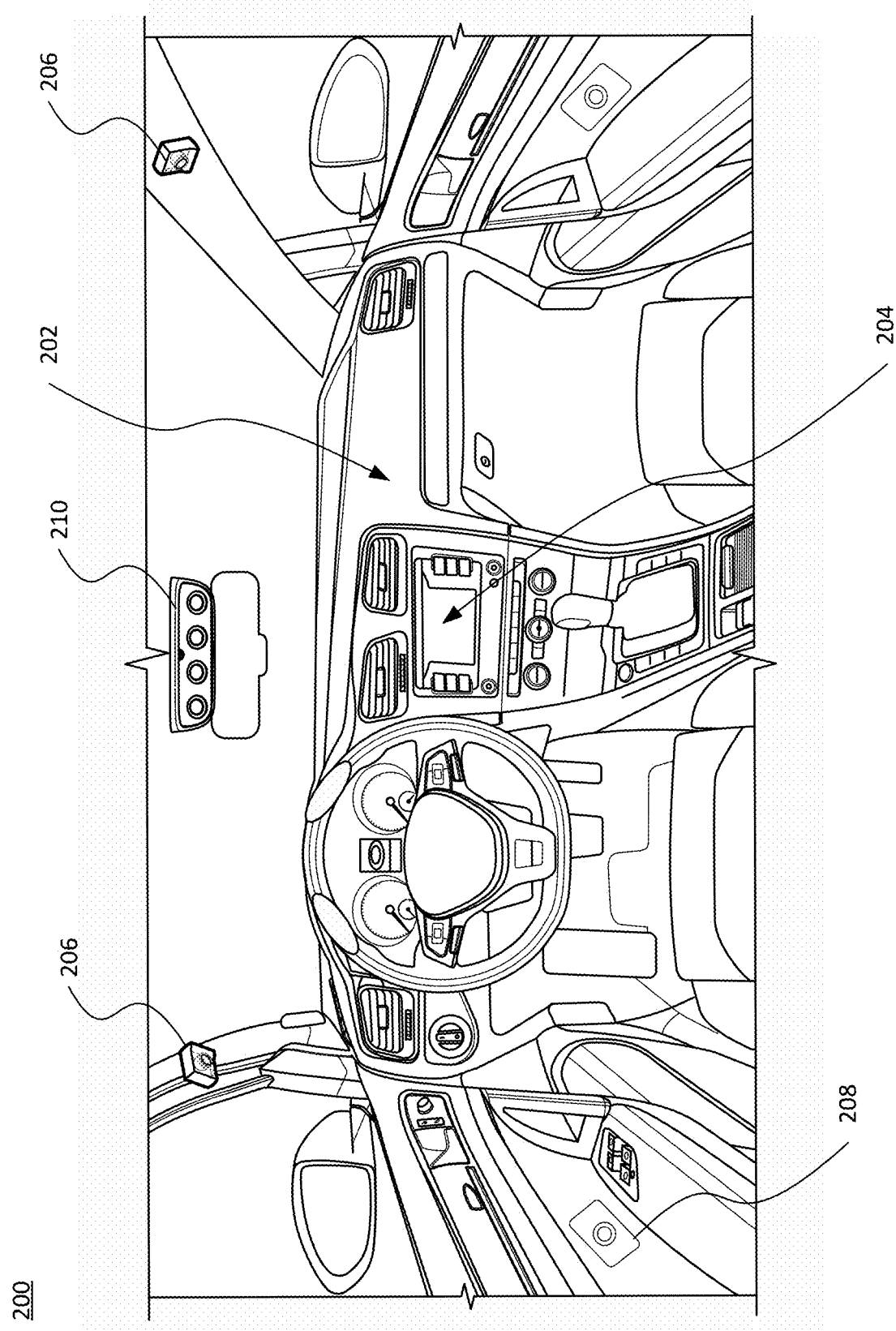
FIG. 2 illustrates in interior view of the vehicle of FIGS. 1A-B in accordance with aspects of the technology.

Turning to FIG. 2, this figure illustrates an example view 200 within the cabin of the vehicle 100, for instance as seen from the front seats. In this view, a dashboard or console area 202 which includes an internal electronic display 204 is visible. Although vehicle 100 includes a steering wheel, gas (acceleration) pedal, or brake (deceleration) pedal which would allow for a semiautonomous or manual driving mode where a passenger would directly control the steering, acceleration and/or deceleration of the vehicle via the drivetrain, these inputs are not necessary for a fully autonomous driving mode. Rather, passenger input may be provided by interaction with the vehicle's user interface system and/or a wireless network connection for an app on the passenger's mobile phone or other personal computing device. By way of example, the internal electronic display 204 may include a touch screen or other user input device for entering information by a passenger such as a destination, etc. Alternatively, internal electronic display 204 may merely provide information to the passenger(s) and need not include a touch screen or other interface for user input.

Also shown in FIG. 2 are sensor units 206, 208 and 210, which may be located at different places within the cabin and storage areas. The sensor units may each include one or more cameras (e.g., optical and/or IR imaging devices, high dynamic range (HDR)-capable cameras, etc.), time of flight sensors, IR illuminators, microphones, pressure sensors or other sensors. Information obtained from the sensors can be sent to an onboard computer system for processing and/or analysis in real time to determine, e.g., a state of the vehicle include seating locations for any passengers, whether there are packages or other objects on a seat, on the floor, in a cupholder, etc. The obtained information may be first processed partially or fully by the sensor unit, or raw or partially processed data may be sent to the onboard computer system. For instance, an HDR camera captures multiple images having different exposure levels at the same time (e.g., 2-4 images). The camera sensor unit may pre-process the images to obtain a single image that is then sent to the computer system for further image processing. Based on this information the vehicle may take certain actions or communicate with a remote system that can schedule a service or provide assistance. By way of example, a neural network evaluating the camera images may determine whether the camera requires cleaning or if there is an obstruction of the camera. In the first situation, the computer system may actuate a cleaning element such as a wiper to clean the camera lens. In the second situation, a service call may be required to correct the obstruction.

Figure 3:
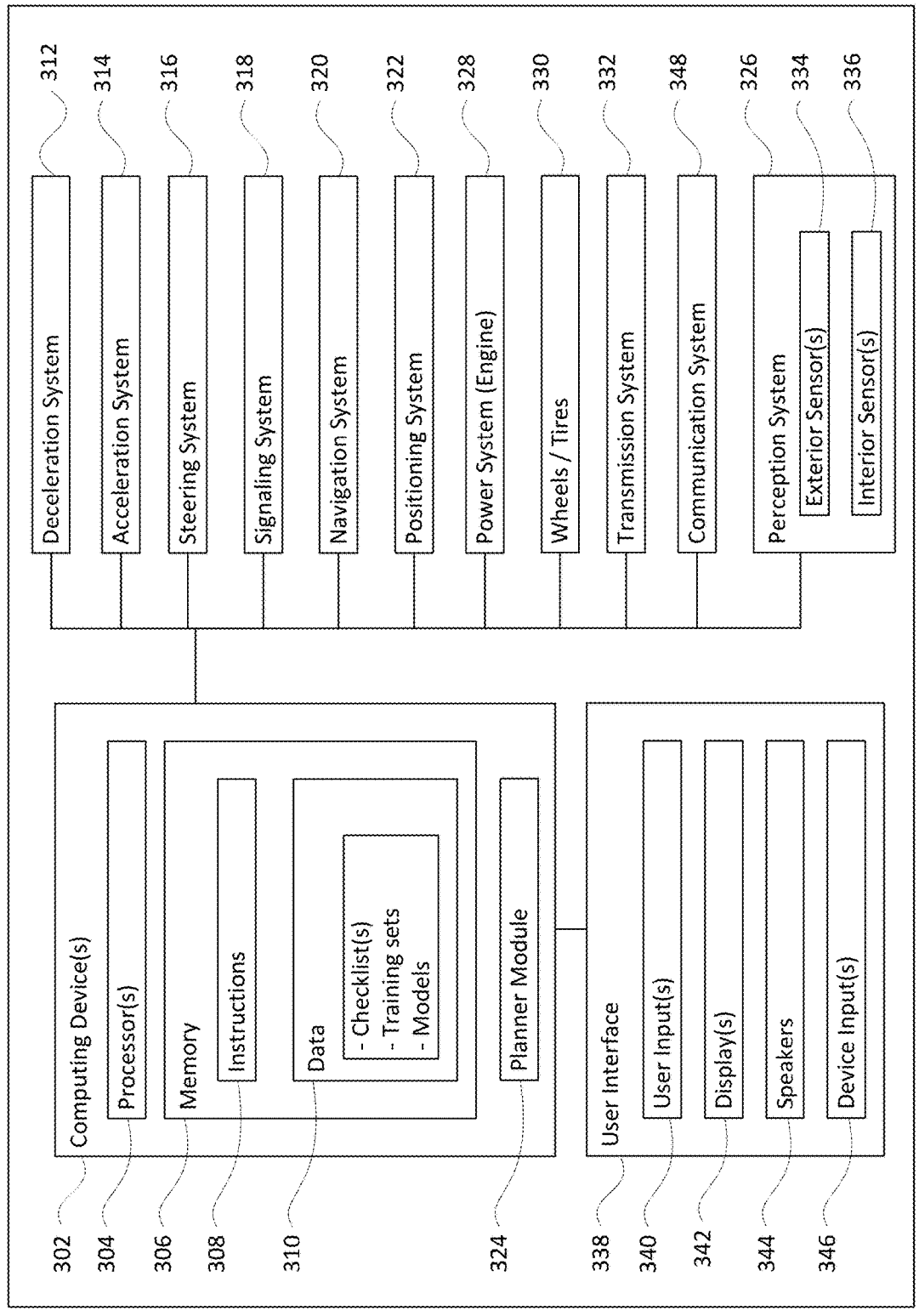
FIG. 3 is a block diagram of systems of an example vehicle in accordance with aspects of the technology.

FIG. 3 illustrates a block diagram 300 with various components and systems of an exemplary vehicle, such as passenger vehicle 100, to operate in an autonomous driving mode. As shown, the block diagram 300 includes one or more computing devices 302, such as computing devices containing one or more processors 304, memory 306 and other components typically present in general purpose computing devices. The memory 306 stores information accessible by the one or more processors 304, including instructions 308 and data 310 that may be executed or otherwise used by the processor(s) 304. The computing system may control overall operation of the vehicle when operating in an autonomous driving mode.

The memory 306 stores information accessible by the processors 304, including instructions 308 and data 310 that may be executed or otherwise used by the processors 304. The memory 306 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 308 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 310 may be retrieved, stored or modified by one or more processors 304 in accordance with the instructions 308. In one example, some or all of the memory 306 may be an event data recorder or other secure data storage system configured to store vehicle diagnostics and/or obtained sensor data, which may be on board the vehicle or remote, depending on the implementation. The data may include, for instance, inspection or operating checklists or other use cases that can be used pre-ride, in-ride and/or post-ride. The data may also include training sets, object models or other information to perform object recognition for different types of objects (e.g., passengers, pets or service animals, bags or other packages, mobile phones or other personal computer devices, etc.)

The processors 304 may be any conventional processors, such as commercially available CPUs. Alternatively, each processor may be a dedicated device such as an ASIC or other hardware-based processor. Although FIG. 3 functionally illustrates the processors, memory, and other elements of computing devices 302 as being within the same block, such devices may actually include multiple processors, computing devices, or memories that may or may not be stored within the same physical housing. Similarly, the memory 306 may be a hard drive or other storage media located in a housing different from that of the processor(s) 304. Accordingly, references to a processor or computing device will be understood to include references to a collection of processors or computing devices or memories that may or may not operate in parallel.

In one example, the computing devices 302 may form an autonomous driving computing system incorporated into vehicle 100. The autonomous driving computing system is configured to communicate with various components of the vehicle. For example, the computing devices 302 may be in communication with various systems of the vehicle, including a driving system including a deceleration system 312 (for controlling braking of the vehicle), acceleration system 314 (for controlling acceleration of the vehicle), steering system 316 (for controlling the orientation of the wheels and direction of the vehicle), signaling system 318 (for controlling turn signals), navigation system 320 (for navigating the vehicle to a location or around objects) and a positioning system 322 (for determining the position of the vehicle, e.g., including the vehicle's pose). The autonomous driving computing system may employ a planner module 324, in accordance with the navigation system 320, the positioning system 322 and/or other components of the system, e.g., for determining a route from a starting point to a destination or for making modifications to various driving aspects in view of current or expected traction conditions.

The computing devices 302 are also operatively coupled to a perception system 326 (for detecting objects in the vehicle's internal and external environments), a power system 328 (for example, a battery and/or gas or diesel powered engine) and a transmission system 332 in order to control the movement, speed, etc., of the vehicle in accordance with the instructions 308 of memory 306 in an autonomous driving mode which does not require or need continuous or periodic input from a passenger of the vehicle. Some or all of the wheels/tires 330 are coupled to the transmission system 332, and the computing devices 32 may be able to receive information about tire pressure, balance and other factors that may impact driving in an autonomous mode.

The computing devices 302 may control the direction and speed of the vehicle, e.g., via the planner module 324, by controlling various components. By way of example, computing devices 302 may navigate the vehicle to a destination location completely autonomously using data from the map information and navigation system 320. Computing devices 302 may use the positioning system 322 to determine the vehicle's location and the perception system 326 to detect and respond to objects when needed to reach the location safely. In order to do so, computing devices 302 may cause the vehicle to accelerate (e.g., by increasing fuel or other energy provided to the engine by acceleration system 314), decelerate (e.g., by decreasing the fuel supplied to the engine, changing gears, and/or by applying brakes by deceleration system 312), change direction (e.g., by turning the front or other wheels of vehicle 100 by steering system 316), and signal such changes (e.g., by lighting turn signals of signaling system 318). Thus, the acceleration system 314 and deceleration system 312 may be a part of a drivetrain or other type of transmission system 332 that includes various components between an engine of the vehicle and the wheels of the vehicle. Again, by controlling these systems, computing devices 302 may also control the transmission system 332 of the vehicle in order to maneuver the vehicle autonomously.

Navigation system 320 may be used by computing devices 302 in order to determine and follow a route to a location. In this regard, the navigation system 320 and/or memory 306 may store map information, e.g., highly detailed maps that computing devices 302 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

By way of example only, the perception system 326 may include one or more light detection and ranging (lidar) sensors, radar units, cameras (e.g., optical and/or IR imaging devices, with or without a neutral-density filter (ND) filter), positioning sensors (e.g., gyroscopes, accelerometers and/or other inertial components), acoustical sensors (e.g., microphones or sonar transducers), and/or any other detection devices. In addition, IR illuminators may also be employed in conjunction with the cameras, for instance to illuminate within the cabin or immediately adjacent to the vehicle. Such sensors of the perception system 326 may detect objects outside of the vehicle and their characteristics such as location, orientation, size, shape, type (for instance, vehicle, pedestrian, bicyclist, etc.), heading, speed of movement relative to the vehicle, etc. To aid in the detection and classification of objects, one or more illuminators may have a combination of IR and visible light to obtain certain color information. Thus, the illuminator may be configured to also emit light in at least part of the visible light spectrum.

As shown in FIG. 3, the perception system 326 includes one or more external sensors 334 for detecting objects external to the vehicle. The sensors 334 are located in one or more sensor units around the vehicle. The detected objects may be other vehicles, obstacles in the roadway, traffic signals, signs, trees, bicyclists, pedestrians, etc. The sensors 334 may also detect certain aspects of weather or other environmental conditions, such as snow, rain or water spray, or puddles, ice or other materials on the roadway.

The perception system 326 also includes other sensors 336 within the vehicle to detect objects and conditions within the vehicle, such as in the passenger compartment and trunk region. For instance, such sensors may detect, e.g., one or more persons, pets, packages, etc., as well as conditions within and/or outside the vehicle such as temperature, humidity, etc. This can include detecting where the passenger(s) is sitting within the vehicle (e.g., front passenger seat versus second or third row seat, left side of the vehicle versus the right side, etc.), evaluating driver awareness, and other situations. The interior sensors 336 may detect the proximity, position and/or line of sight of the passengers in relation to one or more display devices of the passenger compartment, for example to determine how best to present information to the passengers during a ride.

The raw data obtained by the sensors can be processed by the perception system 336 and/or sent for further processing to the computing devices 302 periodically or continuously as the data is generated by the perception system 336. Computing devices 302 may use the positioning system 322 to determine the vehicle's location and perception system 326 to detect and respond to objects when needed to reach the location safely, e.g., via adjustments made by planner module 324. In addition, the computing devices 302 may perform calibration of individual sensors, all sensors in a particular sensor assembly, or between sensors in different sensor assemblies or other physical housings.

As illustrated in FIGS. 1A-B and 2, certain sensors of the perception system 326 may be incorporated into one or more sensor assemblies or housings outside and inside the vehicle. In one example, these may be integrated into the side-view mirrors on the vehicle. In another example, other sensors may be part of the roof-top housing 102, or other sensor housings or units 106a,b, 108a,b, 112 and/or 116. In further examples, cameras and co-located IR illuminators may be disposed within the vehicle along the headliner, the A, B, C or D pillars, etc. The computing devices 302 may communicate with the sensor assemblies located on or otherwise distributed along the vehicle. Each assembly may have one or more types of sensors such as those described above.

Returning to FIG. 3, computing devices 302 may include all of the components normally used in connection with a computing device such as the processor and memory described above as well as a user interface subsystem 338. The user interface subsystem 338 may include one or more user inputs 340 (e.g., a mouse, keyboard, touch screen and/or microphone) and one or more display devices 342 (e.g., a monitor having a screen or any other electrical device that is operable to display information). In this regard, an internal electronic display may be located within a cabin of the vehicle (e.g., 204 in FIG. 2) and may be used by computing devices 302 to provide information to passengers within the vehicle. By way of example, displays may be located, e.g., along the dashboard, on the rear of the front row of seats, on a center console between the front row seats, along the doors of the vehicle, extending from an armrest, etc. Other output devices, such as speaker(s) 344 may also be located within the passenger vehicle. The passenger(s) may communication directly with the vehicle via one or more device inputs 346. The inputs 346 may include a touch screen on an internal electronic display, a microphone for receiving spoken instructions, a haptic sensor for receiving physical feedback, etc.

The vehicle also includes a communication system 348. For instance, the communication system 348 may also include one or more wireless configurations to facilitate communication with other computing devices, such as passenger computing devices within the vehicle, computing devices external to the vehicle such as in another nearby vehicle on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. The communication system 348 may thus include one or more antennas located within the cabin and/or on the vehicle's roof, as well as one or more transceiver modules coupled to the antennas for providing wireless communication.

While the components and systems of FIG. 3 are generally described in relation to a passenger vehicle arrangement, as noted above the technology may be employed with other types of vehicles, such as buses, campers, cargo vehicles, etc. In larger vehicles, the user interface elements such as displays, microphones and speakers may be distributed so that each passenger has his or her own information presentation unit and/or one or more common units that can present status information to larger groups of passengers. Similarly, the interior sensors 336 of the perception system 326 may be arranged (e.g., based on one or more coverage priorities) to have fields of view encompassing different areas throughout the vehicle.

Example Vehicle Implementations

In view of the structures and configurations described above and illustrated in the figures, various aspects will now be described in accordance with aspects of the technology.

A manually driven vehicle or a vehicle with a low level of autonomy can include a driver assistance system. A self-driving vehicle with level 4 or level 5 autonomy that can perform driving actions without human operation has unique requirements and capabilities. This includes making driving decisions based on a planned route, received traffic information, and objects in the external environment detected by the onboard sensors. It also includes determining a status of the vehicle before picking up a passenger, while transporting the passenger to his or her destination, and after the passenger exists the vehicle. In such situations, in order to determine the driver and/or vehicle status and operate accordingly, the vehicle may rely on sensor data obtained from interior sensors distributed throughout the vehicle, such as in the passenger compartment and trunk.

Figure 4A:
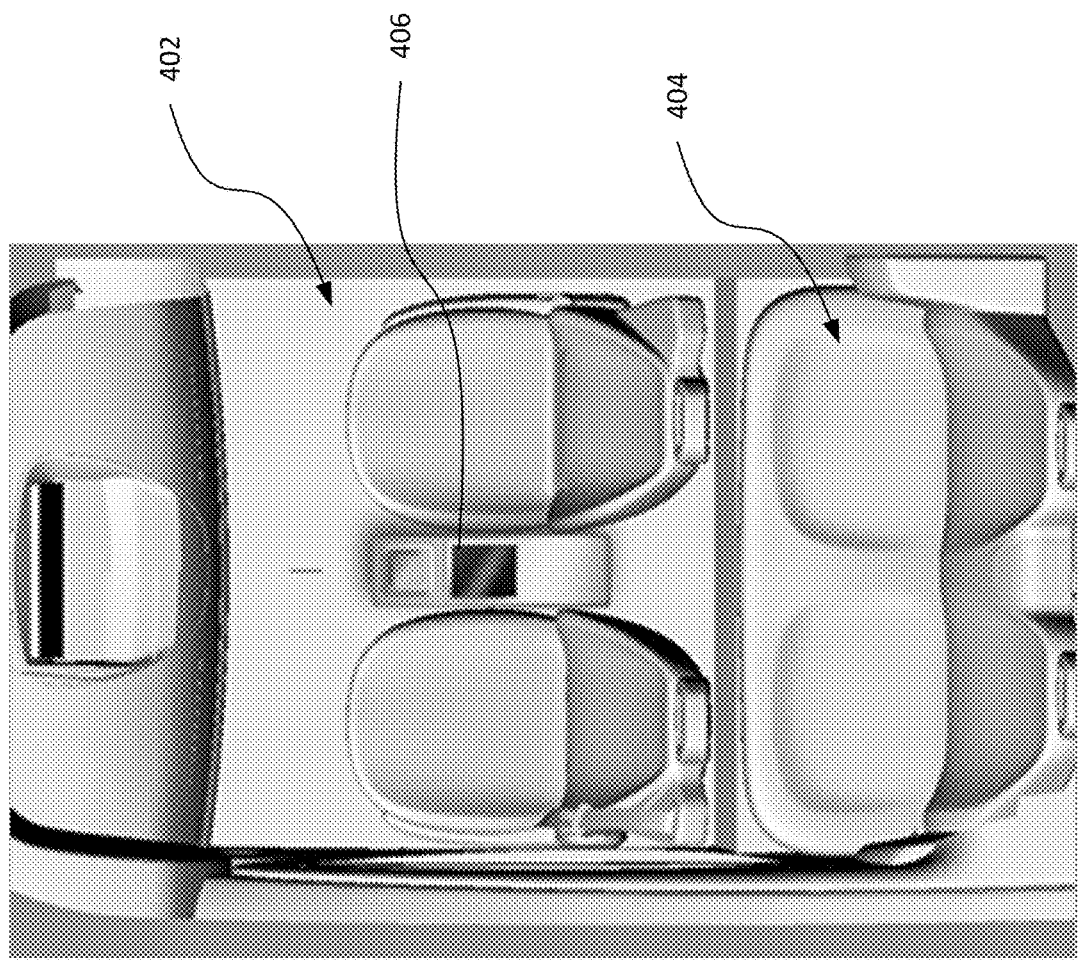
FIGS. 4A-B illustrate example views of interior sections of a vehicle in accordance with aspects of the technology.
Figure 4B:
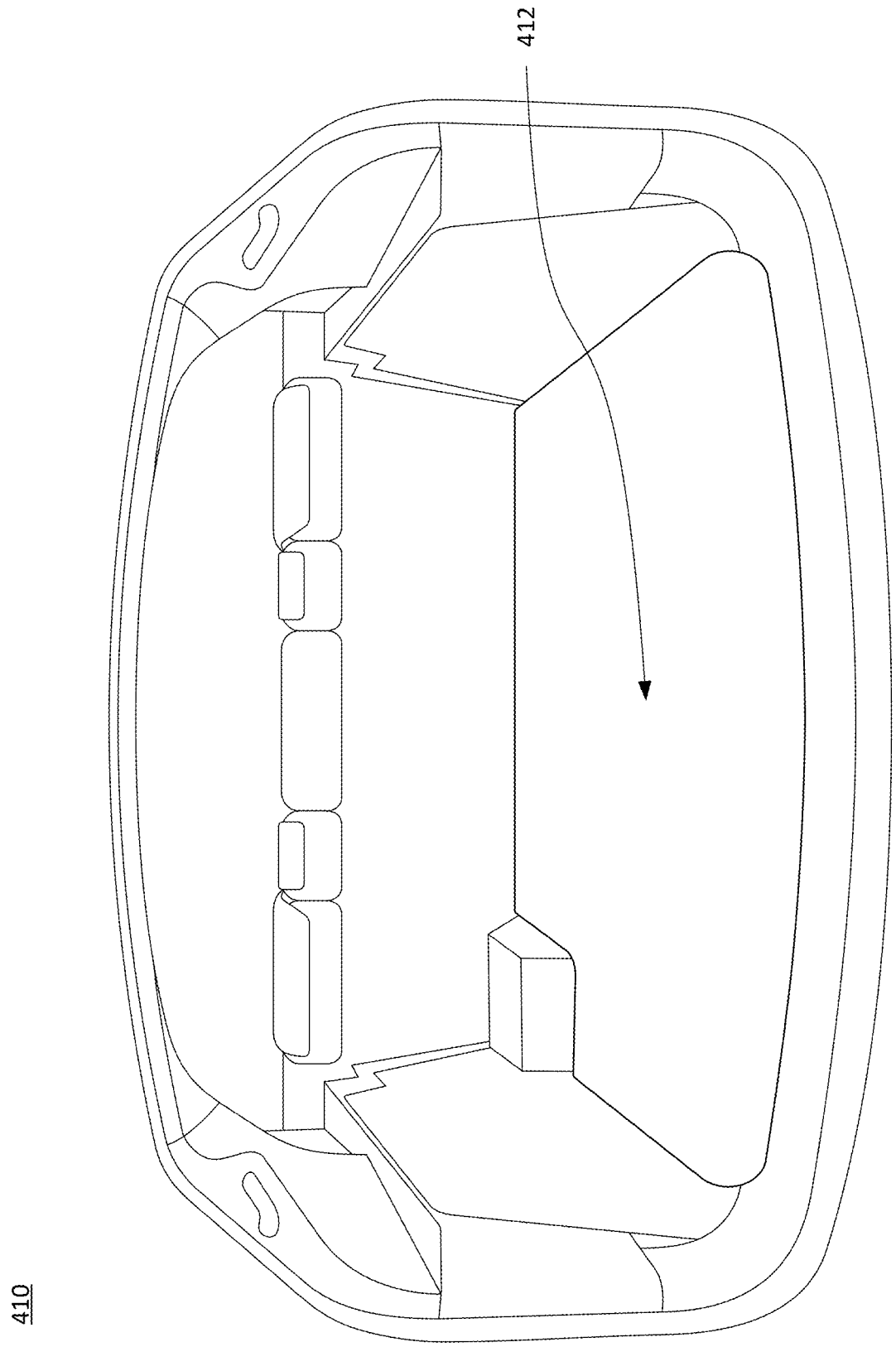

FIG. 4A illustrates a top-down view 400 of a vehicle cabin of an example vehicle, such as vehicle 100 of FIG. 1. As shown, the cabin includes a front seat area 402 and a rear seat area 404. A center console 406 may be disposed between the front seats. FIG. 4B illustrates a perspective view 410 of a trunk region or other cargo space 412 of the vehicle. As noted above, ideally the interior sensor system may have sensors with fields of view that encompass all areas within the vehicle.

Figure 5A:
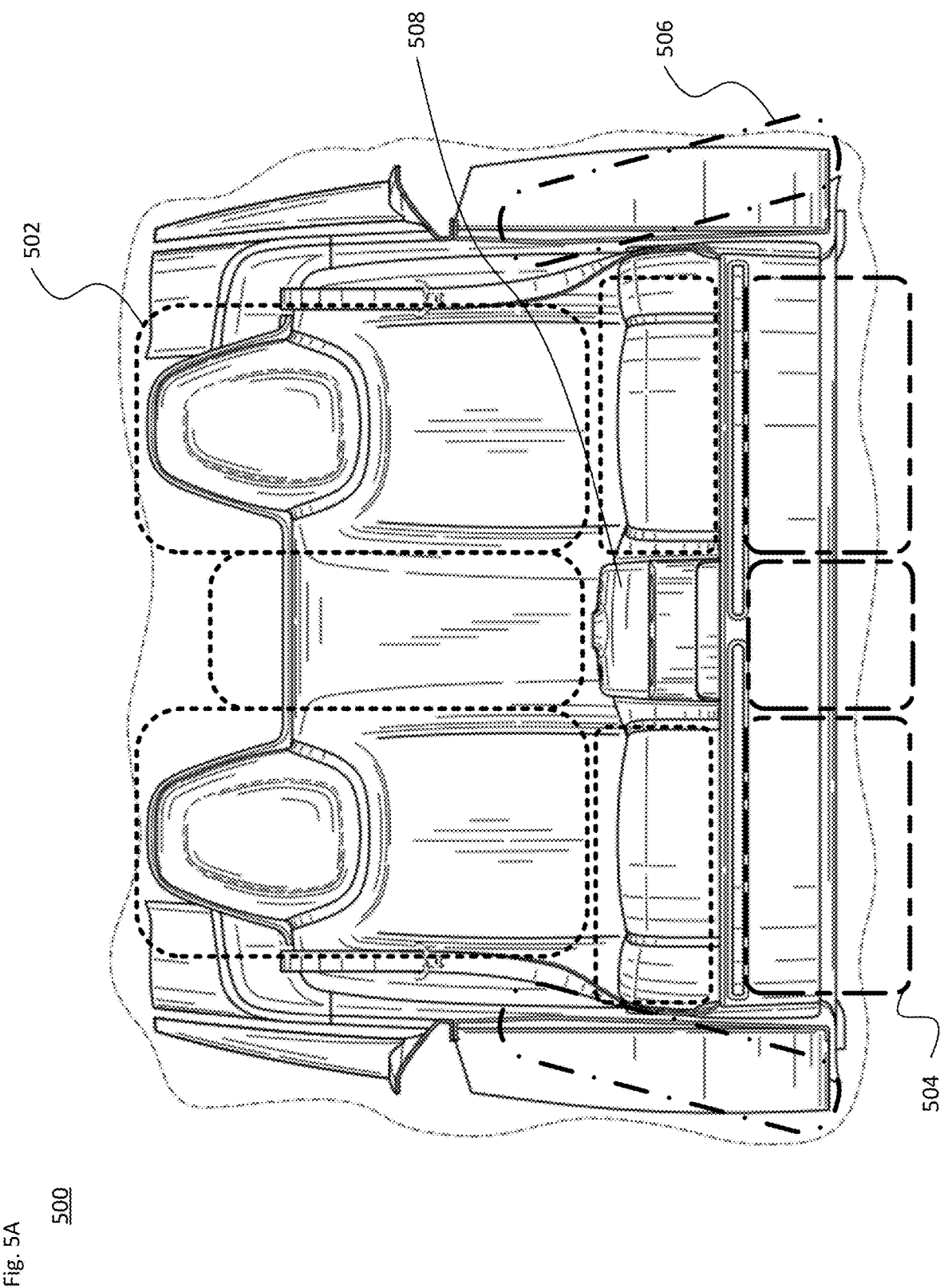

FIGS. 5A-F illustrate different regions of the vehicle cabin and trunk for an exemplary vehicle, such as vehicle 100. The regions are shown with three different areas for sensor detection. In particular, FIG. 5A presents a first view 500 of the rear seats of the vehicle and FIG. 5B presents a second view 510 of the rear seats. As shown, there are three types of areas, namely areas 502 in dotted lines, areas 504 in dashed lines, and areas 506 in dash-dot lines. A console 508 is also shown between the two rear seats. In this example, certain areas (such as areas 502) may be higher priority than other areas, (such as areas 504 and 506). For instance, higher priority areas may benefit from IR illumination in evening, overcast or other low-light situations.

Figure 5C:
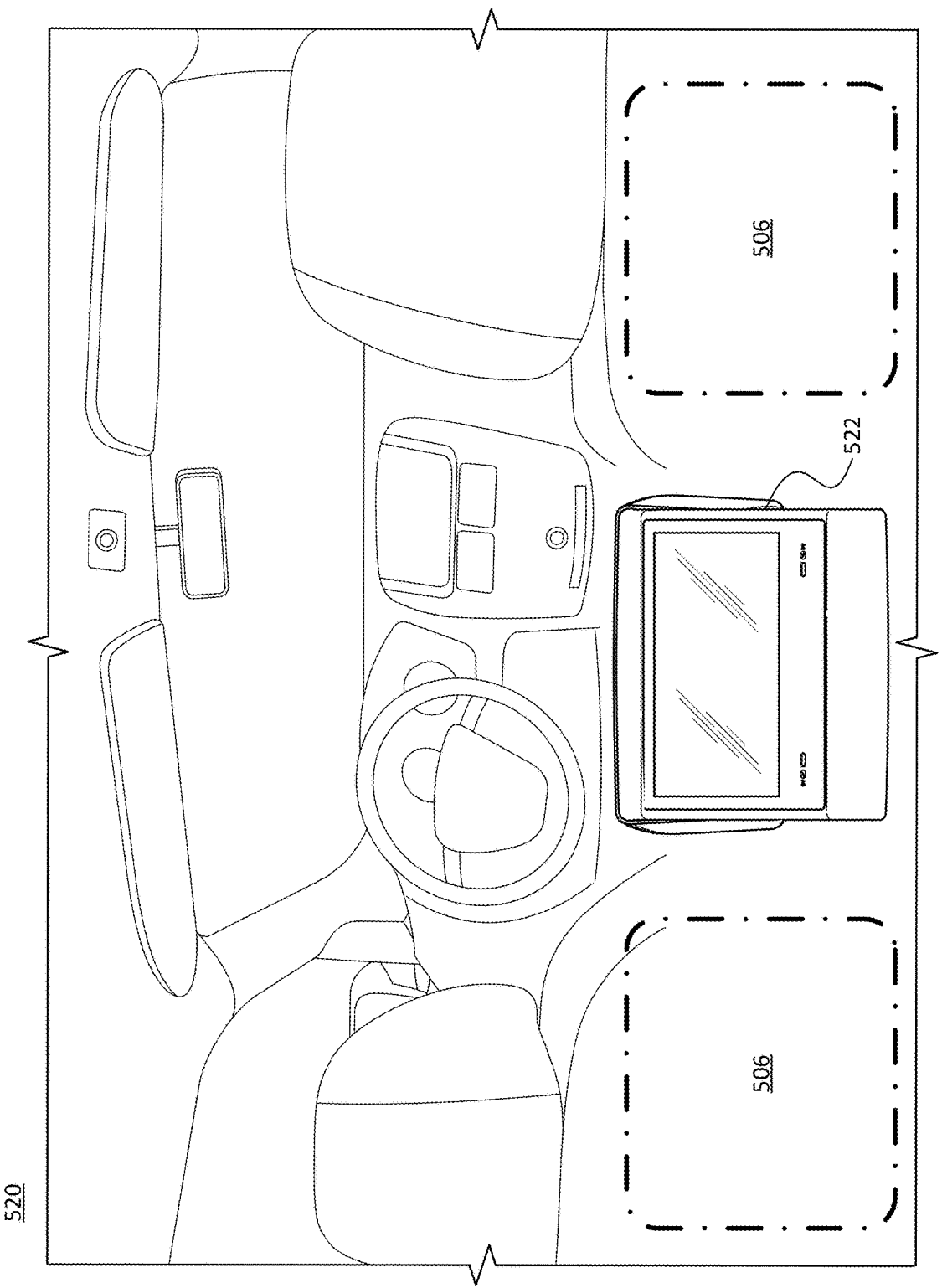
Figure 5D:
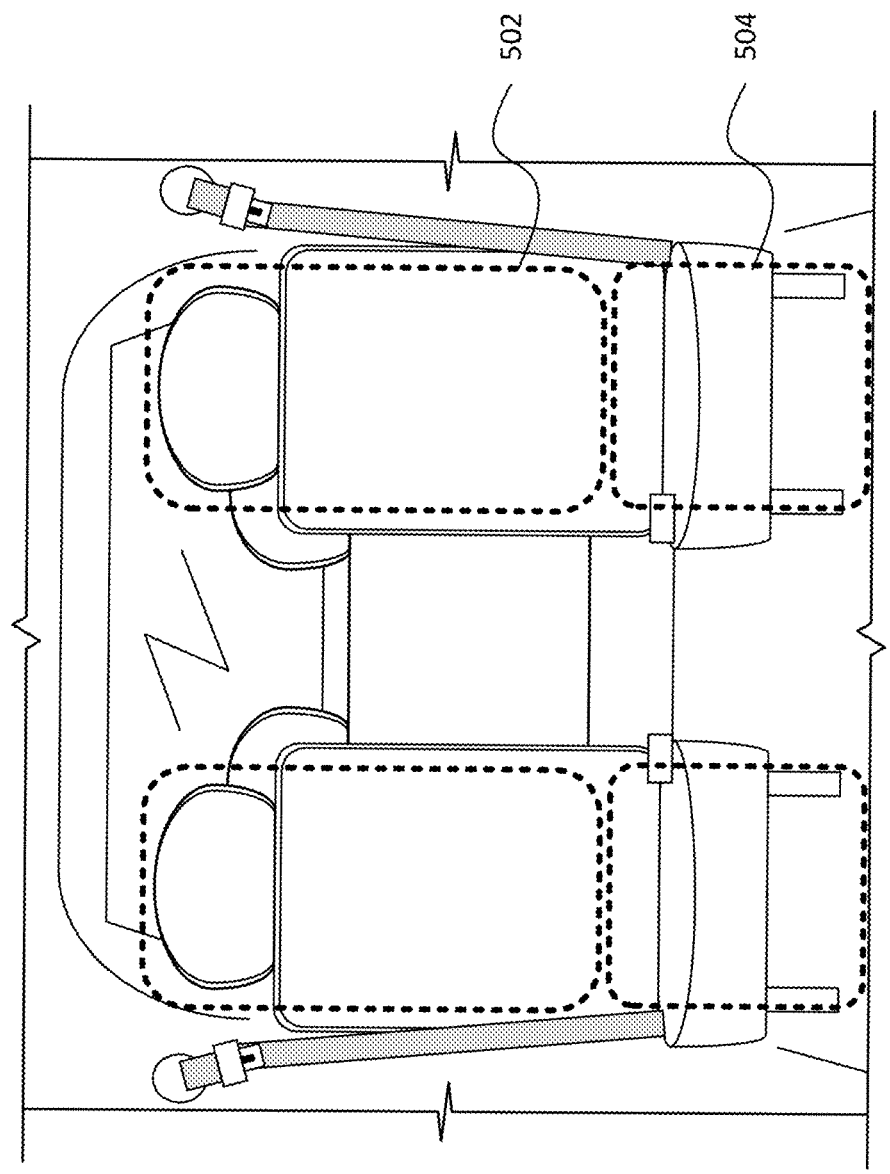
Figure 5E:
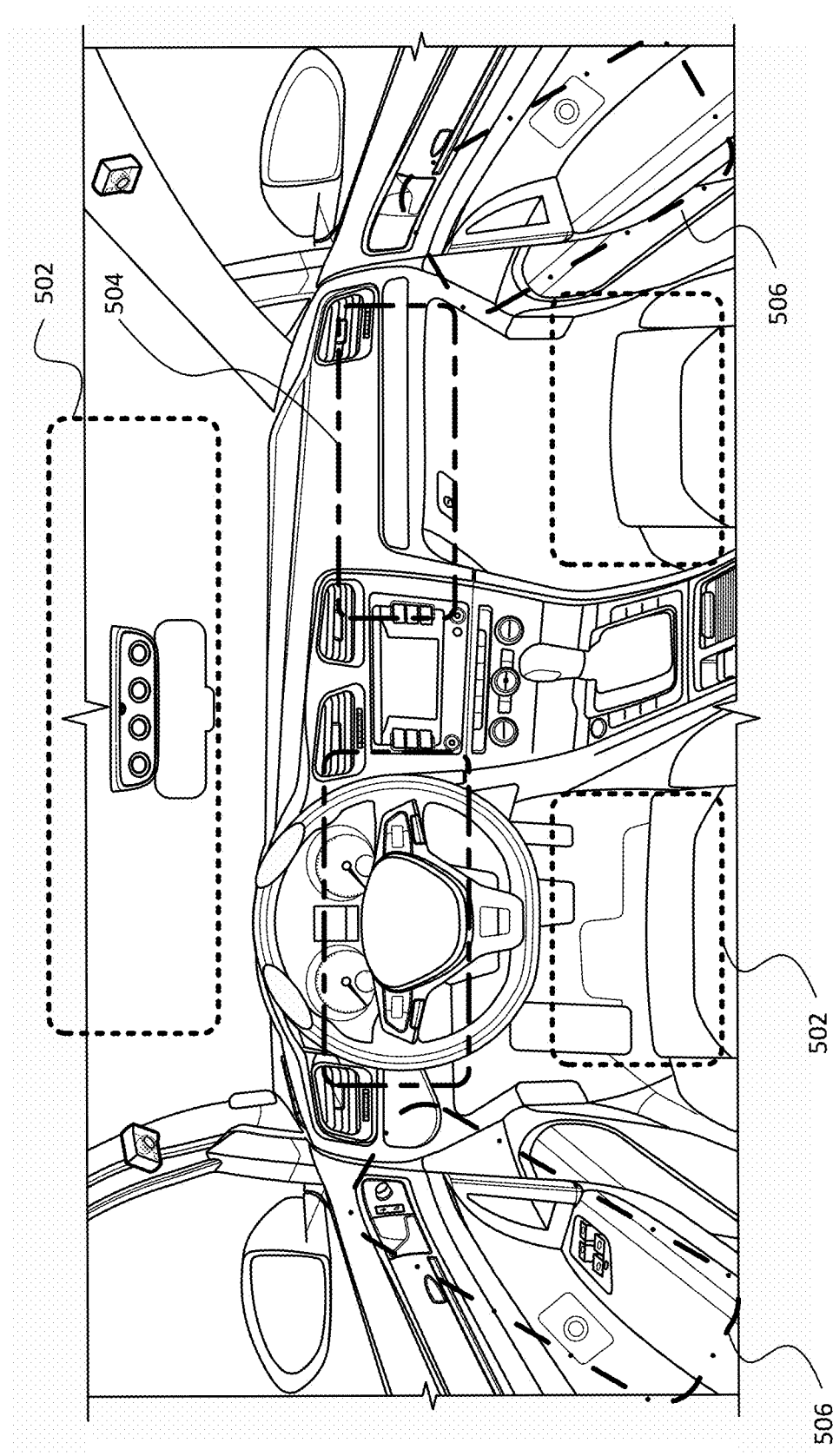

FIG. 5C presents a view 520 of the backs of the front seats of a vehicle. Here, areas 506 on the backs of the front seats are shown in dash-dot lines. Also shown is a console 522, which is positioned between the front seats. In various embodiments one or both consoles 508 and 522 may be within the vehicle or not included at all. FIG. 5D presents a first view 530 of the front seat section of the cabin, facing the seats. FIG. 5E presents a second view 540 of the front seat section from the viewpoint of the passenger(s) facing the front of the vehicle. And FIG. 5F presents a view 550 of a trunk or other storage area of the vehicle (e.g., when the rear seats are folded down). Here, there may be a main cargo area encompassed by dash-dot region 504, and an entrance area encompassed by dashed region 502. The entrance area may be, e.g., where a passenger or other person leans in to place a package in the main cargo area. Coverage of this area may be very important, for instance when the vehicle determines whether to close the trunk.

Visual information detected in each area may be analyzed via an on-board (or remote) processing system for each of the regions. This may be done, for instance, using machine learning techniques to identify if a portion of the cabin differs from a baseline ("clean") configuration. However, the ability to identify such differences may depend on the quality of the data, including sensor resolution. By way of example, one constraint for an optical camera having resolution on the order of 1-4 megapixels (MP) is the ability to detect a matte black object of a predetermined size. For instance, the object may be between 70×40×5 mm and 110×90×20 mm. While a higher resolution imager may be able to satisfactorily detect an object smaller than the above examples, this may require an increased amount of onboard processing power and/or data storage. Other constraints may be a low light signal to noise ratio (SNR) of between 5:1 and 15:1 (or more or less), and a stray light rejection ratio on the order of $0.8 \times^{-4}$ to $1.5 \times^{-4}$, for instance with a maximum source radius of no more than ≤6.0°. The higher the stray light rejection ratio, the better the system is able to handle sources of light that could degrade the image quality, for instance due to image flare. This could come from dashboard or window reflections, or from a user device (e.g., cellphone flash turned on, etc.) The radius of the source represents how much space the stray light source is taking in the image.

The different regions and/or different priority levels of the cabin and storage areas can be covered by a set of cameras distributed at various locations. FIG. 2 illustrated one example where cameras and other sensors 206, 208 and/or 210 may be located. In other examples, cameras and co-located IR illuminators may be positioned in other areas of the interior, such as along a pillar (such as an A, B, C or D pillar), in the console, in or adjacent to a door, in a headrest or armrest, etc. Regardless of the exact position, the sensors should be arranged to provide fields of view sufficient to cover the selected areas or zones that are of interest (e.g., the seats, floor, storage places). For example, narrower FOV cameras may be disposed in more places in the vehicle or larger FOV in fewer places. In many scenarios, at least one camera is positioned per row of seating and one camera for the trunk or other cargo space. For vehicles with an aisle, a pair of cameras may be positioned on each side of the aisle per row. Regardless of the placement of the cameras, the components need to meet any applicable safety standards, including FMVSS 201U (Occupant Protection in Interior Impact).

In one scenario, there is a least one camera module arranged to view the front seat areas, and at least one camera module arranged to view the rear seat areas. Additional camera modules may be arranged to provide sufficient coverage of the various cabin zones in view of the priority levels as noted above. By way of example, the optical cameras may be fisheye lens-type cameras with IR illumination. For instance, the IR illumination may be on the order of 800 to 1000 nm.

According to one aspect, the IR illumination is able to cover the same field of view as a co-located camera. However, one constraint is that the IR illuminator(s) be placed so that the illumination does not degrade the image quality (e.g., due to leakage or flare). For instance, the IR illuminator(s) may be under the same constraint as for stray light rejection.

In some situations, IR illumination can affect color accuracy. This could potentially affect the ability to correctly recognize a detected object in an image. Thus, in one aspect the cameras may be calibrated to maximize the color accuracy. The IR illumination for in-cabin cameras may be activated based on ambient light conditions within the main cabin, whether the vehicle's headlights are on, and/or other criteria. For a camera(s) viewing the trunk area, there may be no IR illumination, IR illumination triggered according to ambient light conditions in the trunk, or IR illumination only during a pre- or post-ride vehicle check.

Pre- and/or post-ride vehicle checks may be performed for the cabin area and/or the trunk using the various cameras and illuminators. Additional checks may be performed during a ride (e.g., "mid-ride" checks). How such mid-ride checks are performed may depend on time of day, driving conditions, vehicle configurations and/or other factors. For example, at night or other low-ambient light situations, interior visible cabin lights should not be turned on to perform a check, since this can be distracting to the passenger(s) and could also degrade the imagery taken by the camera(s). Whether the vehicle has a solid roof, a moon roof or a sunroof may also affect the imaging approach. In one example, the exposure time for a given check may be on the order of 50-150 ms (e.g., 100 ms) or more or less. An auto exposure algorithm may be used to define the gain and exposure time for each camera. This will account for the amount of ambient light and potential flaring from stray light sources.

The interior sensors may be employed in various use situations, which generally fall into pre-ride situations, post-ride situations, and mid-ride while transporting one or more passengers to their destination(s).

Imagery from the cameras may be communicated to the on-board vehicle control system via a wired link (e.g., power over data line) or a wireless link. Then the system may perform real-time object recognition, for instance via machine learning techniques, to identify different conditions or situations, such as a passenger being improperly buckled, an object has been inadvertently left in the vehicle, cleaning is required, whether certain areas are clear (e.g., so that the trunk door can be closed or a window rolled up), and whether someone in the driver's seat has their hands on the steering wheel. Alternatively or additionally, certain imagery may be sent to a remote assistance service for processing. For example, the remote assistance service may have more processing resources or a more robust machine learning image processing technique that can identify specific items or other objects in the vehicle.

Example Camera Module Configuration

Figure 6A:
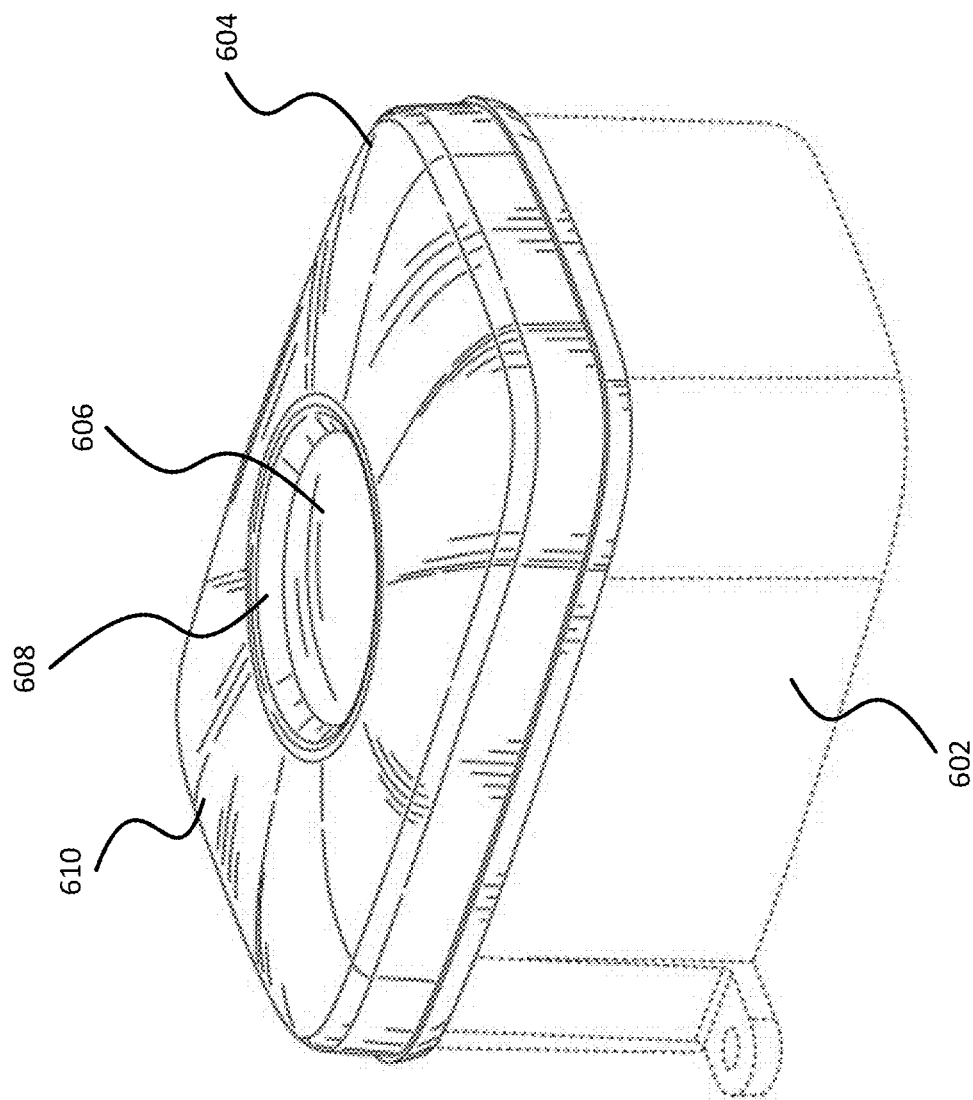
FIGS. 6A-B illustrate an example of a camera module assembly in accordance with aspects of the technology.

FIG. 6A illustrates one example of a camera module assembly 600 in accordance with aspects of the technology. As shown, the camera module assembly includes a base 602 (shown in dashed lines), a camera module cover 604 and a lens 606. The cover 604 may be generally rectangular to file the base 602 or to otherwise fit in a designated space within the vehicle. The cover 604 may alternatively have other geometric shapes, such as circular, oval, etc.

Figure 6B:
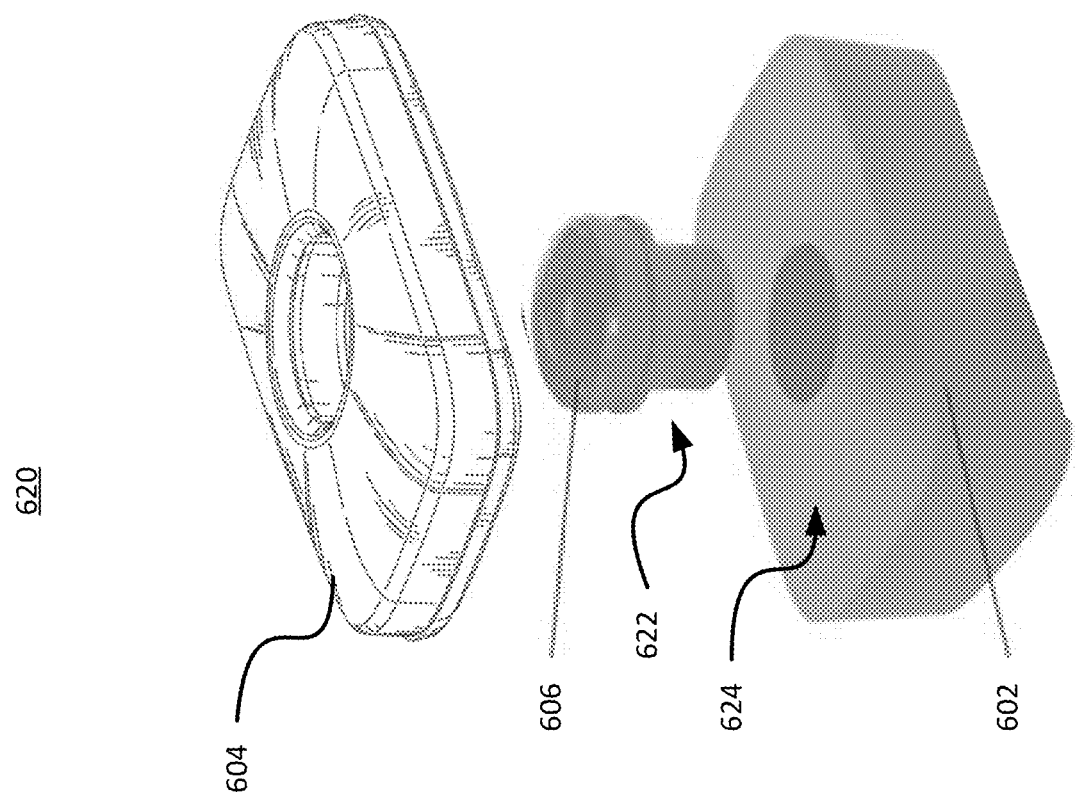

As seen in FIG. 6A and exploded view 620 of FIG. 6B, the lens 606 is received within the cover 604. It is positioned so that a beveled edge 608 of the cover 604 surrounds the lens 606, and so that a top surface 610 of the cover 604 is above the lens 606. In particular, the lens 606 would be disposed below a plane of the top surface 610. As shown, the top surface is generally rectangular, which may have rounded corners. The outer perimeter of the top surface may be beveled or curved.

According to the exploded view 620 of FIG. 6B, lens unit 622 (e.g., a fisheye lens-type camera) is surrounded by the base 602, which may have an IR illumination surface 624. One or more discrete IR illuminators may be disposed within the base 602. In order to prevent light from the IR illuminator(s) from adversely affecting the imagery taken by the camera unit, the cover 604 may be arranged as follows.

FIGS. 7A-B illustrate an example 700 of top and bottom perspective views, respectively, of the camera module cover 604 of FIGS. 6A-B. As shown, the cover unit includes the top surface 610, a central opening 702 adapted to receive the lens of the camera unit, and an outer sidewall 704 extending continuously around the perimeter of the top surface 610. The beveled edge 608 is affixed or integrally connected to an interior sidewall 706, which extends down into the cover 604 away from the top surface 610. As shown, the interior sidewall 706 may be cylindrical, or may have another geometric shape.

The interior sidewall 706, the circumferential lip 708 and the beveled edge 608 are formed of an IR-blocking or otherwise non-transparent materials. By way of example, the interior sidewall 706 may have the same appearance as the IR-transparent material of the top surface (e.g., glossy black); however, it blocks IR light from leaking to the lens of the camera unit. In one example, the top surface diffuses or otherwise evenly distributes the IR light emitted from the base, while the interior sidewall blocks IR leakage to the lens.

The top surface 610 is fully or substantially transparent to IR light. By way of example, when IR light on the order 800 to 1000 nm is emitted by the IR illuminator(s) in the base 602, the top surface 610 is able to pass between 85% to 100% of the light into the external environment. In one example, the top surface 610 comprises a plastic, which can be colored to blend in with other components or parts within the interior of the vehicle. For instance, the plastic may be visually a glossy black or other color. As seen in the bottom perspective view of FIG. 7B, the interior sidewall 706 is continuous. A circumferential lip or edge 708 extends into the central opening, and adjoins the beveled edge 608 of the cover 604.

Figure 7C:
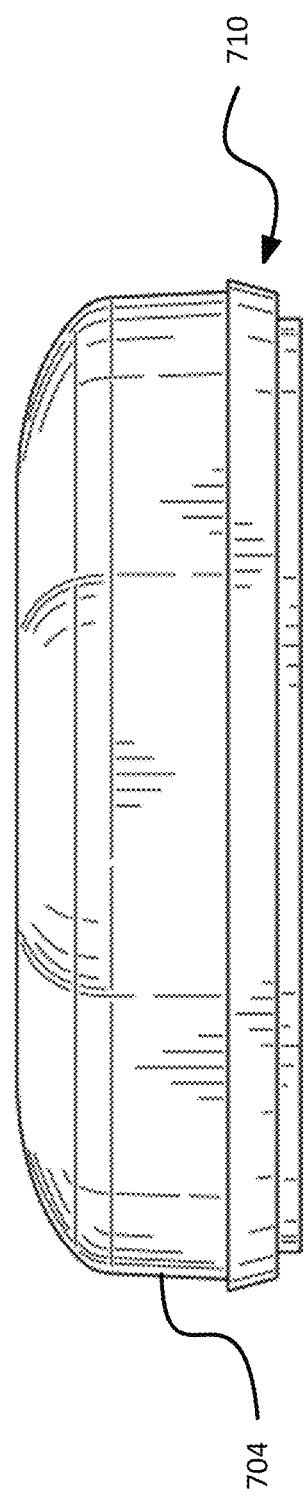
Figure 7D:
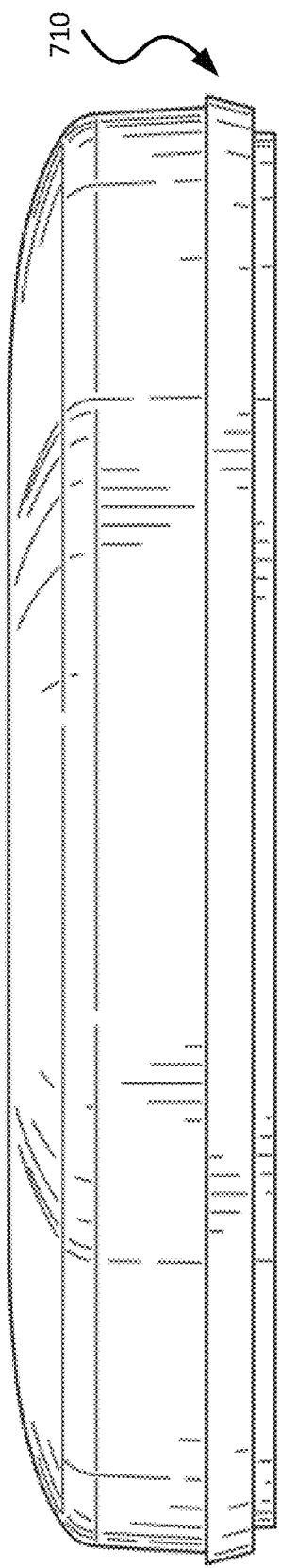
Figure 7E:
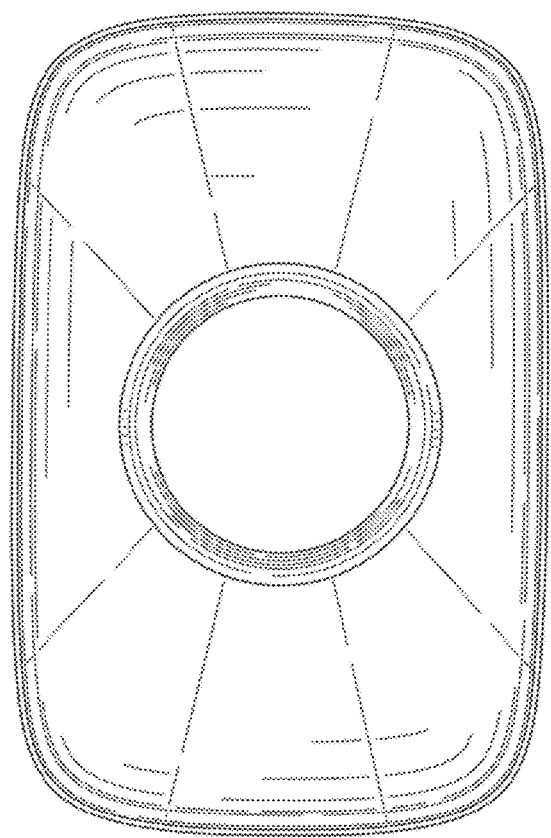
Figure 7F:
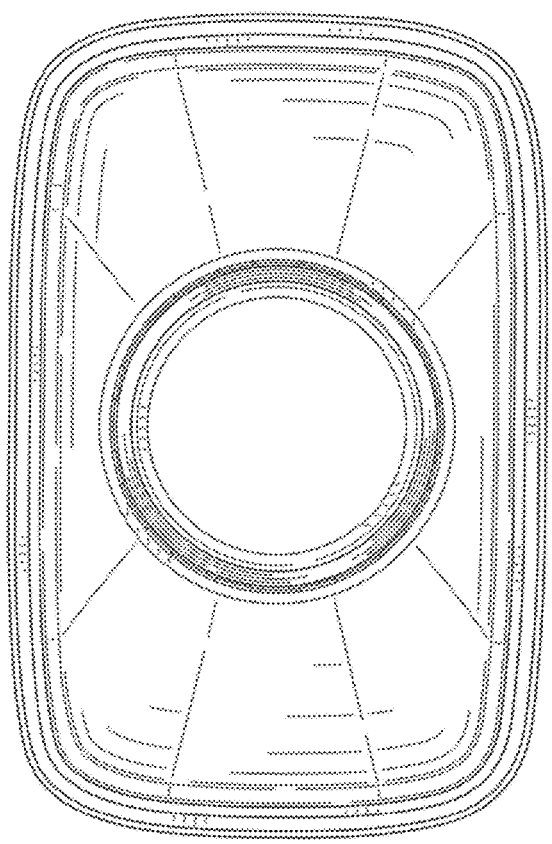

FIGS. 7C-D illustrate a front view and a side view, respectively, of the cover 604. As shown, the outer sidewall 704 may include a lip 710, for instance that abuts a top edge of the base 602, e.g., when press-fit or snap-fit together. FIGS. 7E-F illustrate top and bottom views, respectively, of the cover 604.

Figure 8:
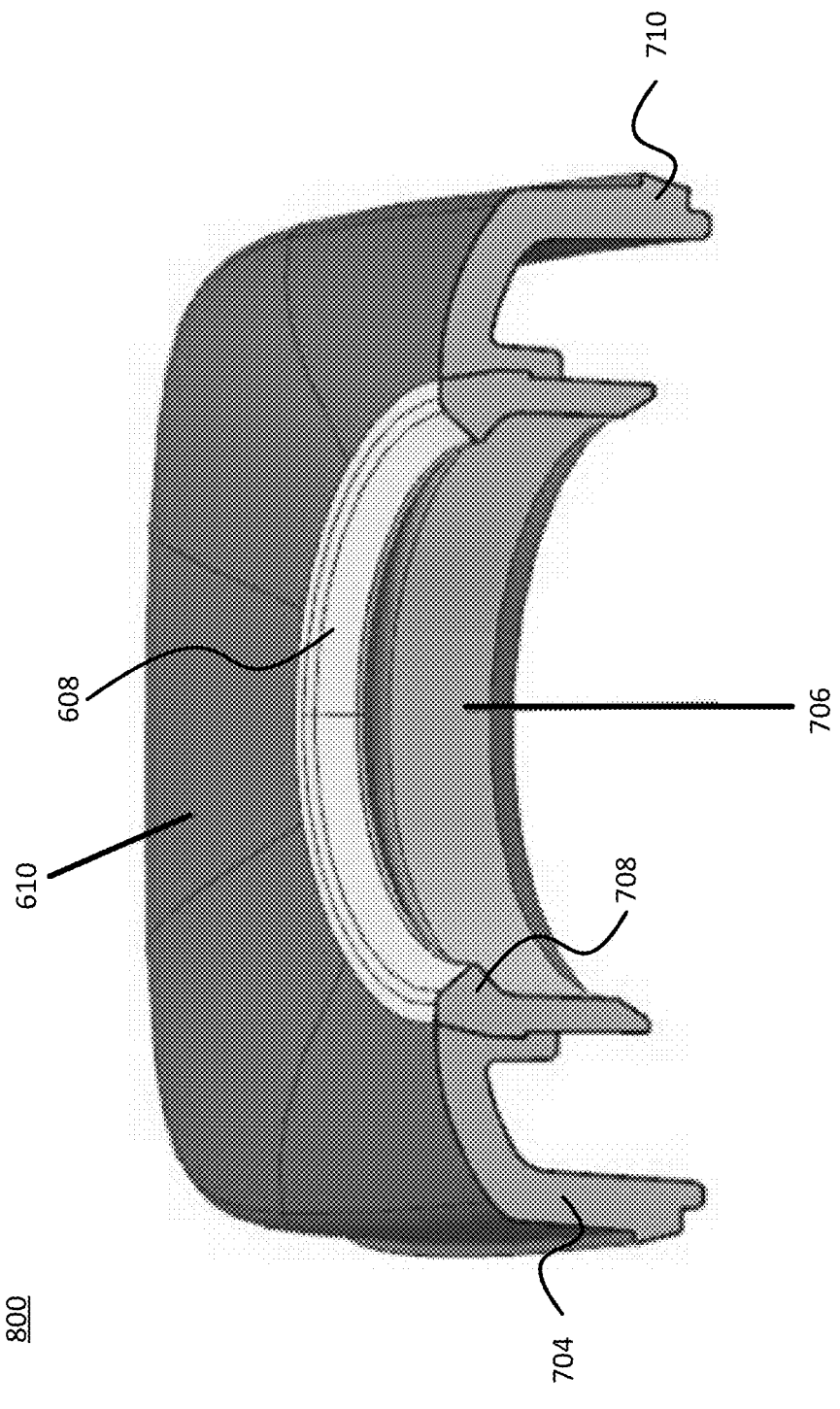
FIG. 8 illustrates a cutaway view of the camera module cover of FIGS. 7A-F in accordance with aspects of the technology.

FIG. 8 illustrates a cutaway view 800 of the camera module cover 604. As shown, the interior sidewall and the exterior sidewall are spaced apart from one another, forming a void or other open area therebetween. The infrared light from the IR illuminator(s) is able to pass through the space between the interior and exterior sidewalls, and then out through the top surface 610.

The outer sidewall 704 and top surface 610 may be formed as one continuous piece of a first, IR-transparent material, such as by injection molding. The beveled edge 608, lip 708 and interior sidewall 706 may also be formed as one continuous piece of a second, IR-blocking material. The beveled edge 608 and lip 708 may intersect and form a continuous protrusion that extends into the central opening 702. In one example, the two pieces of material are formed as a single part by double injection molding. The molding process may be performed sequentially, with either the IR-transparent or IR-blocking material formed first, or concurrently. In another example, the two pieces may be press fit, coupled together with a fastener, or secured using an adhesive or other bonding agent.

Due to the arrangement of the IR-blocking material, and placement of the lens beneath the top surface of the IR-emissive material, the camera module cover prevents leakage into the camera lens. This enables the camera module to obtain high quality images with IR illumination from one or more IR emitters disposed around the lens.

Finally, as noted above, the technology is applicable for various types of vehicles, including passenger cars, buses, RVs and trucks or other cargo carrying vehicles, as well as in other interior locations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A camera module cover for an infrared-illuminated camera module, the camera module cover comprising:
    an infrared-transparent surface having first and second sides and having an opening therethrough, the opening configured to receive a lens of a camera module, the first side configured to face an external environment and the second side opposite the first side configured to face a base unit of the camera module, and the infrared-transparent surface being configured to pass infrared light from an infrared emitter of the base unit therethrough to illuminate the external environment;

an exterior sidewall extending around the infrared-transparent surface; and an infrared-blocking member disposed within the opening and directly coupled to the infrared-transparent surface, the infrared blocking member including an interior sidewall configured to surround the lens of the camera module and block the infrared light from the infrared emitter from entering the lens of the camera module.

2. The camera module cover of claim 1, wherein the infrared-blocking member further includes a beveled edge adjoining the infrared-transparent surface, the beveled edge angling away from the infrared transparent surface, so that the lens of the camera module, when the camera module is covered by the camera module cover, is disposed below a plane of the infrared-transparent surface.

3. The camera module cover of claim 2, wherein the infrared-blocking member further includes a lip that adjoins the beveled edge and is adjacent to the interior sidewall.

4. The camera module cover of claim 3, wherein the interior sidewall, beveled edge and lip are formed from a single piece of infrared-blocking material.

5. The camera module cover of claim 1, wherein the exterior sidewall is formed of a same material as the infrared-transparent surface.

6. The camera module cover of claim 1, wherein the exterior sidewall and the infrared-transparent surface are formed as one unit.

7. The camera module cover of claim 6, wherein the one unit is formed by injection molding.

8. The camera module cover of claim 7, wherein the infrared-blocking member is formed as a second unit by injection molding.

9. The camera module cover of claim 8, wherein the first unit and the second unit are formed by a double injection molding process.

10. The camera module cover of claim 1, wherein the interior sidewall and the exterior sidewall are spaced apart from one another, forming an open area therebetween so that the infrared light is able to pass through the open area unimpeded.

11. The camera module cover of claim 1, wherein the infrared-transparent surface has a rectangular shape.

12. The camera module cover of claim 11, wherein the opening is centrally disposed along the infrared-transparent surface.

13. A camera module assembly, comprising:
the camera module cover of claim 1; and
the infrared emitter of the base unit.

14. The camera module assembly of claim 13, further comprising the camera module.

15. A method of fabricating a camera module cover, the method comprising:
forming an infrared-transparent surface having first and second sides and having an opening therethrough, the opening configured to receive a lens of a camera module, the first side configured to face an external environment and the second side opposite the first side configured to face a base unit of the camera module, and the infrared-transparent surface being configured to pass infrared light from an infrared emitter of the base unit therethrough to illuminate the external environment;

forming an exterior sidewall extending around the infrared-transparent surface; and forming an infrared-blocking member so that the infrared-blocking member is disposed within the opening and coupled to the infrared-transparent surface, the infrared blocking member including an interior sidewall configured to surround the lens of the camera module and block the infrared light from the infrared emitter from entering the lens of the camera module.

16. The method of claim 15, wherein the exterior sidewall is formed concurrently with the infrared-transparent surface using injection molding.

17. The method of claim 15, wherein the infrared-blocking member is formed using injection molding.

18. The method of claim 15, further comprising securing the infrared-blocking member along the opening of the infrared-transparent surface.

19. The method of claim 18, wherein securing the infrared-blocking member along the opening of the infrared-transparent surface is performed during a double injection molding process.

20. The method of claim 15, wherein forming the infrared-blocking member includes:
forming a beveled edge adjoining the opening of the infrared-transparent surface, the beveled edge angling away from the infrared transparent surface so that the lens of the camera module, when the camera module is covered by the camera module cover, is disposed below a plane of the infrared-transparent surface; and forming a lip that adjoins the beveled edge and is adjacent to the interior sidewall.

21. The camera module cover of claim 1, wherein the interior sidewall is cylindrical.

22. The camera module cover of claim 1, wherein the interior sidewall extends from the second side of the infrared-transparent surface towards the base unit.

* * * * *

UNITED STATES PATENT AND TRADEMARK OFFICE
CERTIFICATE OF CORRECTION

PATENT NO. : 11,262,562 B2  
APPLICATION NO. : 16/822272  
DATED : March 1, 2022  
INVENTOR(S) : Zhaokun Wang et al.

Page 1 of 1

It is certified that error appears in the above-identified patent and that said Letters Patent is hereby corrected as shown below:

In the Claims

Column 13, Claim 9, Line 36:  
Now reads: "wherein the first"; should read -- wherein the one --

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*